United States Patent
Marwaha et al.

(10) Patent No.: US 9,567,978 B2
(45) Date of Patent: Feb. 14, 2017

(54) SYSTEM AND METHOD FOR ADAPTIVE ROTOR IMBALANCE CONTROL

(71) Applicant: General Electric Company, Schenectady, NY (US)

(72) Inventors: Monika Marwaha, Bangalore (IN); Brandon Shane Gerber, Charleston, SC (US); Jignesh Govindlal Gandhi, Simpsonville, SC (US); Mark Edward Cardinal, Altamont, NY (US); Thomas Franklin Perley, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 14/524,229

(22) Filed: Oct. 27, 2014

(65) Prior Publication Data

US 2016/0115941 A1   Apr. 28, 2016

(51) Int. Cl.
F03D 7/04 (2006.01)
F03D 7/02 (2006.01)
F03D 11/00 (2006.01)

(52) U.S. Cl.
CPC ............ *F03D 7/046* (2013.01); *F03D 7/0204* (2013.01); *F03D 7/024* (2013.01); *F03D 7/0224* (2013.01); *F03D 7/0296* (2013.01); *F03D 11/0091* (2013.01); *Y02E 10/723* (2013.01)

(58) Field of Classification Search
CPC ...... F03D 7/024; F03D 7/0224; F03D 7/0204; F03D 7/046; F03D 11/0091; F03D 7/0296
See application file for complete search history.

(56) References Cited

U.S. PATENT DOCUMENTS 7,452,185 B2   11/2008   Ide et al.
2006/0002792 A1*   1/2006   Moroz .................... F03D 1/008
                                                     416/1

(Continued)

FOREIGN PATENT DOCUMENTS

EP   1612413 A2   1/2006
EP   2060785 A1   5/2009

(Continued)

OTHER PUBLICATIONS

European Search Report and Opinion issued in connection with corresponding EP Application No. 15191328.2 on Mar. 15, 2016.

*Primary Examiner* — Igor Kershteyn
(74) *Attorney, Agent, or Firm* — James W. Pemrick; Ernest G. Cusick; Frank A. Landgraff (57) ABSTRACT

A control system for a wind turbine includes a detecting system configured to determine at least one of a rotor load, a wind shear, a wind speed, and a load imbalance due to wind shear. An adjusting system is configured to adjust a shaft moment set point correction value based on at least one of the rotor load, the wind shear, the wind speed, and the load imbalance. A compensating system is configured to compute a shaft moment correction command based on the shaft moment set point correction value output from the adjusting system. A pitch system is configured to adjust a pitch of at least one blade of the wind turbine based on the shaft moment set point correction command, or a yaw system is configured to adjust the yaw position of a rotor based on the shaft moment set point correction command.

20 Claims, 6 Drawing Sheets

(56) References Cited

U.S. PATENT DOCUMENTS

| | | | |
|---|---|---|---|
| 2009/0129924 A1* | 5/2009 | Rebsdorf | F03D 7/0224 416/43 |
| 2010/0014969 A1* | 1/2010 | Wilson | F03D 1/008 416/1 |
| 2012/0076652 A1 | 3/2012 | Ventzke et al. | |
| 2014/0003936 A1 | 1/2014 | Agarwal et al. | |
| 2014/0003939 A1* | 1/2014 | Adams | F03D 7/0224 416/1 |
| 2014/0030090 A1 | 1/2014 | Kammer et al. | |

FOREIGN PATENT DOCUMENTS

| | | |
|---|---|---|
| EP | 2447527 A1 | 5/2012 |
| WO | 2008041066 A1 | 4/2008 |
| WO | 2009047061 A1 | 4/2009 |
| WO | 2010016764 A1 | 2/2010 |

* cited by examiner

SYSTEM AND METHOD FOR ADAPTIVE ROTOR IMBALANCE CONTROL

BACKGROUND OF THE INVENTION

The disclosure relates generally to a wind turbine and more specifically to a system and method for adjusting the shaft moment set point correction based on environmental conditions resulting in wind turbine load imbalance.

Modern wind turbines operate in a wide range of wind conditions. These wind conditions can be broadly divided into two categories, below rated speeds and above rated speeds. To produce power in these wind conditions, wind turbines may include sophisticated control systems such as pitch controllers and torque controllers. These controllers account for changes in the wind conditions and accompanying changes in wind turbine dynamics. For example, pitch controllers (or pitch systems) generally vary the pitch angle of rotor blades to account for (or adapt to) the changes in wind conditions and turbine dynamics. During below rated wind speeds, wind power may be lower than the rated power output of the wind turbine. In this situation, the pitch controller may attempt to maximize the power output by pitching the rotor blades substantially perpendicular to the wind direction. Alternatively, during above rated wind speeds, wind power may be greater than the rated power output of the wind turbine. Therefore, in this case, the pitch controller may restrain wind energy conversion by pitching the rotor blades such that only a part of the wind energy impinges on the rotor blades. By controlling the pitch angle, the pitch controller/system thus controls the velocity of the rotor blades and in turn the energy generated by the wind turbine.

Along with maintaining rotor velocity, pitch controllers may also be employed to reduce tower oscillations. Tower oscillations or vibrations occur due to various disturbances, such as turbulence, inefficient damping, or transition between the two wind conditions. Moreover, the tower may vibrate along any degree of freedom. For example, the tower may vibrate in a fore-aft direction (commonly referred to as tower nodding), in a side-to-side direction (commonly referred to as tower naying), or along its longitudinal axis (commonly referred to as torsional vibration).

Tower nodding is usually caused by aerodynamic thrust and rotation of the rotor blades. Every time a rotor blade passes in front of the tower, the thrust of the wind impinging on the tower decreases. Such continuous variation in wind force may induce oscillations in the tower. Moreover, if the rotor velocity is such that a rotor blade passes over the tower each time the tower is in one of its extreme positions (forward or backward), the tower oscillations may be amplified. Typically, the oscillations in the fore-aft direction are automatically minimized due to aerodynamic damping. Aerodynamic damping relies on the fact that the top of the tower constantly oscillates in the fore-aft direction. When the top of the tower moves upwind (or forward), the rotor thrust is increased. This increase in rotor thrust pushes the tower back downwind. The downwind push in turn aids in dampening the tower oscillations. Similarly, when the top of the tower moves downwind, the rotor thrust may be decreased. This decrease in rotor thrust pushes the tower back upwind. The upwind push also aids in dampening the tower oscillations.

Typically, the pitch controller utilizes two separate control loops for the two functions, controlling the rotor velocity and reducing the tower oscillations. A rotor velocity control loop is employed to determine a pitch angle to control rotor velocity and a tower-damping control loop is used to compute a pitch angle to reduce tower oscillations. Often, these feedback loops operate relatively independently of each other. For example, the rotor velocity control loop may determine the pitch angle based on rotor velocity, wind speed, and current pitch angle. The tower-damping control loop, on the other hand, may determine the pitch angle based on tower deflection, tower top velocity, tower top acceleration, current pitch angle, and wind speed. Because of this independence, the currently available rotor velocity control loops may compute a pitch angle to maintain rotor speed that may disadvantageously induce tower oscillations instead of reducing them. Moreover, these rotor velocity control loops may cause energy amplification in the rotor near tower resonance frequencies. Such amplification may increase oscillations in the tower and increase the fatigue load placed on the wind turbine. Over time, such fatigue loads may reduce the life of wind turbine parts and increase the expenses associated with wind turbines.

Gravity tends to bend the rotor down. Positive wind shear tends to bend the rotor up, and usually is present (high cycle fatigue) and increases with increasing wind speed. At some operating points wind shear can equal the gravitational force but is opposite in direction and cancels the bending moment from gravity if not corrected. The thrust component also helps to combat the gravity load, since many wind turbines have a rotor tilt angle in the machine head, the rotor naturally tries to pick the rotor up and this bending moment also increases with wind speed. The bending moment is easily determined due to the geometry of the system and the thrust estimation. The bending moment can be accounted for when the amount of shear load is identified. For "standard" conditions (positive wind shear), the moment due to wind shear and thrust/tilt are complimentary and oppose gravity. There are some conditions "negative shear" coupled with the right wind speed so that achieve a balanced aerodynamic load, the nose down wind shear moment is equal and opposite to the nose up thrust/tilt moment so that all that remains in the moment due to gravity (probably seen only rarely).

Shear applies forces to the blades and hub and positive shear essentially transfers bending forces from the blades to the hub and shaft. The wind shear applies an asymmetric load across the rotor which results in a bending moment being transferred to the hub/shaft. Positive shear creates a nose-up bending moment and opposes gravity while negative shear creates a nose-down moment and compliments gravity. There is a limit on the amount of pitching the turbine is able to do to either overcome blade/hub forces or to compensate for gravity. When the shear controller is in a limit, it is also not able to respond to additional steady state or dynamic (relatively fast changes in shear). Being able to adjust for dynamic conditions can reduce fatigue and other dynamic stresses on the shaft and blade/hub assembly. Since the pitch system has limited capabilities, being able to balance the amount of compensation that is being done for both gravity and shear maintains a balance between the pitch system demand and the machine fatigue and ensure the wind turbine is always operating within a target zone (until the environment demands more than the machine can handle) while also constructing a balance between the amount of bandwidth that is being used for the steady state vs. dynamic compensation portions.

Imbalance load limitations such as environmental conditions including shear, gravity, turbulence, wind miss-alignments, etc., result in environmentally induced rotor imbalance. Other forms of rotor imbalance are self-induced due to control, manufacturing, and installation variation.

BRIEF DESCRIPTION OF THE INVENTION

In accordance with one embodiment described herein, a control system for a wind turbine includes a detecting system configured to determine at least one of a rotor load, a wind shear, a wind speed, and a load imbalance due to wind shear. An adjusting system is configured to adjust a shaft moment set point correction value based on at least one of the rotor load, the wind shear, the wind speed, and the load imbalance. A compensating system is configured to compute a shaft moment correction command based on the shaft moment set point correction value output from the adjusting system. A pitch system is configured to adjust a pitch of at least one blade of the wind turbine based on the shaft moment set point correction command, or a yaw system is configured to adjust the yaw position of a rotor based on the shaft moment set point correction command.

In accordance with another embodiment described herein, a method for controlling rotor imbalance in a wind turbine includes the steps of detecting at least one of a rotor load, a wind shear, a wind speed, and a load imbalance, and selecting a shaft moment set point correction value based on at least one of the rotor load, the wind speed, the wind shear, and the load imbalance. Additional steps are used for computing a shaft moment correction command based on the shaft moment set point correction value output from the selecting step; and controlling a pitch system to adjust a load of at least one blade of the wind turbine based on the shaft moment correction command, or controlling a yaw system to adjust a rotor position based on the shaft moment set point correction value.

In accordance with another embodiment described herein, a wind turbine includes a tower configured to support a nacelle and a rotor. The rotor has at least one rotor blade. A control system is programmed for performing the steps of, detecting at least one of a rotor load, a wind shear, a wind speed, and a load imbalance due to wind shear, and selecting a shaft moment set point correction value based on at least one of the rotor load, the wind shear, the wind speed, and the load imbalance due to wind shear. The control system is also programmed for performing the steps of, computing a shaft moment correction command based on the shaft moment set point correction value output from the selecting step, and controlling a pitch system to adjust the load of at least one blade of the wind turbine based on the shaft moment correction command.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As will be described in detail hereinafter, various embodiments of an exemplary wind turbine control system and method for adjusting the shaft moment set point correction value in an operating wind turbine are presented. By employing the methods and the various embodiments of the wind turbine control system described hereinafter, the shaft moment set point correction value may be adjusted based on at least one of wind shear, wind speed, and load imbalance due to wind shear. Also, the wind turbine control system may help in reducing wear and tear on pitch control components, which in turn reduces the cost of energy.

Pitching of the rotor blades is desired for lower loads and higher annual energy production (AEP). However, rotor imbalance control is designed to track a fixed value of shaft moment set point. This value is set once and never changed. In reality, this set point is not optimal for every value of wind shear. As the wind shear varies, the rotor imbalance control system can over pitch or activate the pitch systems more than they need to be activated. This overuse of the pitch system can cause premature wear and tear of the pitch system components (e.g., pitch motors, pitch gears, etc.). According to aspects of the present disclosure, an improved method and system is provided that varies the shaft moment set point correction value based on at least one of wind shear, wind speed, and load imbalance due to wind shear, so the pitch system is not activated more than required for a specific wind shear environment. By changing the shaft moment set point correction based on specific wind shear values, the pitch system activation will be reduced and the wind turbine will operate more efficiently.

Figure 1:
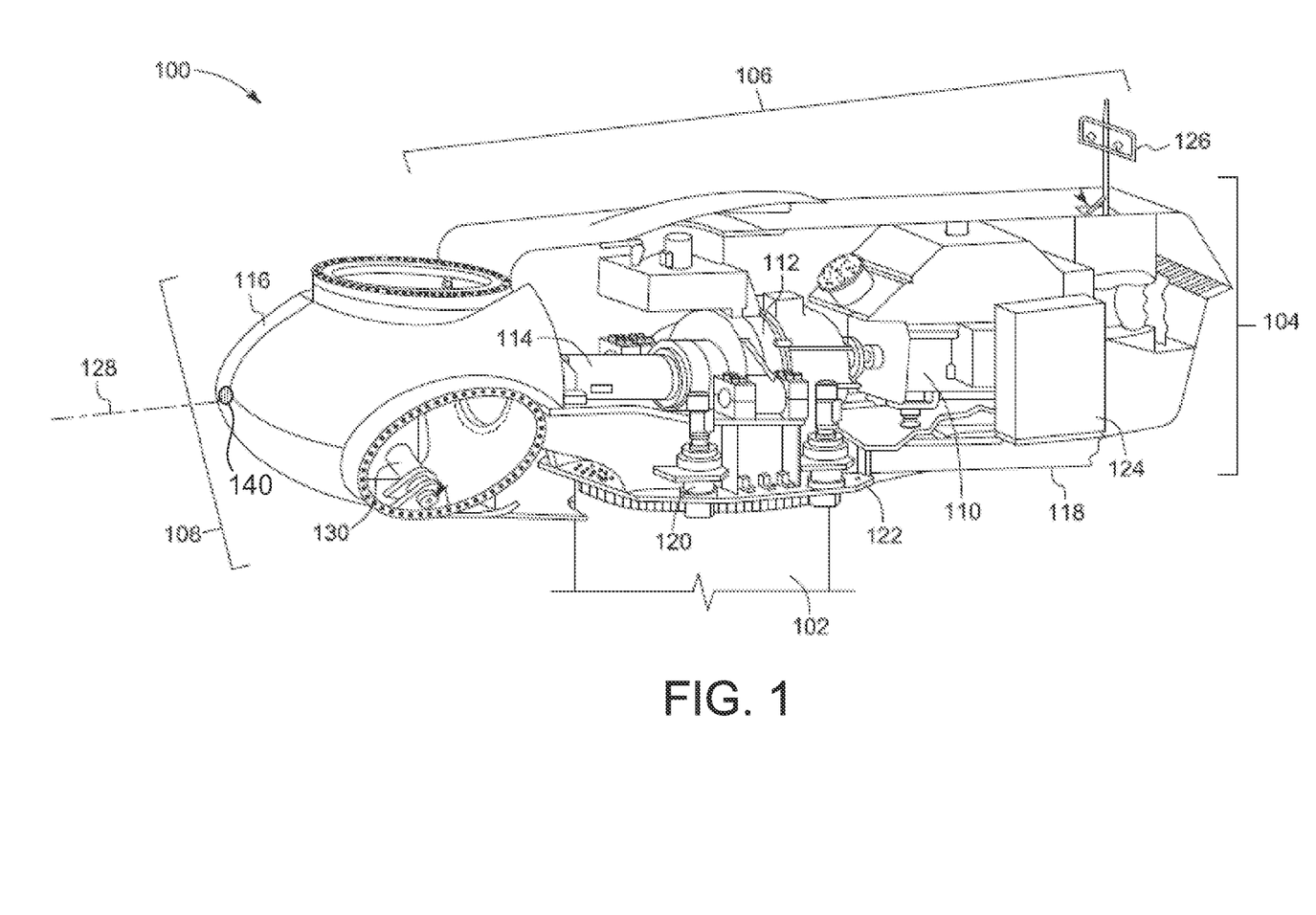
FIG. 1 illustrates a perspective view of a wind turbine, in accordance with aspects of the present disclosure.

Turning now to the drawings, and referring to FIG. 1, a partial perspective view of a wind turbine 100, in accordance with aspects of the present disclosure, is illustrated. The wind turbine 100 is configured to convert kinetic energy of wind passing across the wind turbine 100 into electrical energy. Particularly, the wind turbine 100 includes a plurality of mechanical moving parts that aid in converting the kinetic energy of the wind into mechanical energy. The mechanical energy is in turn used to generate electrical energy. In a presently contemplated configuration, the wind turbine 100 includes a tower 102, configured to support nacelle 106 and rotor 108, and a power unit 104. The tower 102 operates to elevate the power unit 104 to a height above ground level or sea level at which faster moving wind passes across the wind turbine 100. The height of the tower 102 may be selected based on factors and conditions well-known in the art.

The power unit 104 may be configured to convert the kinetic energy of the wind into electrical energy. The power unit 104 may include one or more sub-units such as a nacelle 106 and a rotor 108. The nacelle 106 houses components for converting the mechanical energy of the rotor 108 into electrical energy. Specifically, the nacelle 106 houses a generator 110 that is used to generate the electrical energy based on the mechanical energy provided by the rotor 108. In addition to the generator 110, the nacelle 106 may also house other components, such as, but not limited to, a gearbox 112, a rotor shaft 114, a yaw drive 120, and a control system 124.

The rotor shaft 114 is connected to a rotor hub 116 and the gearbox 112, as depicted in FIG. 1. The rotor shaft 114 may be used to drive an optional high speed shaft (not shown in FIG. 1) that is enclosed within the gearbox 112 and may further drive a generator 110 that is mounted on a main frame 118 to generate the electrical energy. In one embodiment, the gearbox 112 and the rotor shaft 114 may be configured to operate, control, and/or optimize the performance of the wind turbine 100. Further, the yaw drive 120 and a yaw deck 122 may provide a yaw control system for the wind turbine 100. In one embodiment, the yaw control system may be electrically operated and controlled by the control system 124 based on the information received from an anemometer 126 mounted on the nacelle 106.

The rotor 108 is configured to convert the kinetic energy of wind passing across the wind turbine 100 into mechanical energy. This converted mechanical energy is further provided to the generator 110 for generating electrical energy. In the presently contemplated configuration, the rotor 108 is operatively coupled to the rotor shaft 114 via a bearing assembly. The rotor 108 includes the rotor hub 116 and a plurality of blades (shown in FIG. 2) that project outwardly from the rotor hub 116 at locations circumferentially distributed thereabout. In the example depicted in FIG. 1, the rotor hub 116 is shown as including three blades. However, the number of blades may vary. The blades are configured to interact with passing air flow to produce lift that causes the rotor hub 116 to rotate about a longitudinal axis 128. Further, by rotating the rotor hub 116, the rotor shaft 114 coupled to the rotor hub 116 also rotates causing the generator 110 to generate electrical energy.

In accordance with the embodiment of FIG. 1, the control system 124 may include one or more microcontrollers (not shown in FIG. 1) that are used for overall system monitoring and controlling of the wind turbine 100. In one example, the system monitoring and controlling may include pitch and speed regulation, high-speed shaft and yaw brake control, yaw and pump motor control, and fault monitoring. Further, the control system 124 may provide control signals to a pitch drive 130 (or pitch system) to control a pitch of the blades. In one embodiment, the pitch of the blades may be individually controlled by the pitch drive 130. For example, each blade may have a separate pitch drive 130 that varies or changes the pitch of the corresponding blade based on the control signal received from the control system 124.

The wind turbine 100 is designed to generate electrical energy over a wide range of wind speeds. However, in a particular range of wind speeds, for example 80%-120% of the rated wind speed, the rotor 108 may undergo high aerodynamic thrust loading of the rotor. In some instances, this thrust loading may deflect the blade or the rotor to the point that exceeds the safety margins established for turbine certification. In some circumstances, a blade might strike the tower 102 causing a destruction of the wind turbine. Wind loads on the blades may transfer undesired loads onto the rotor and bearings associated therewith, and these loads could cause wear and tear of the rotor shaft bearings.

To address these problems, in accordance with exemplary aspects of the present disclosure, the wind turbine 100 may include the control system 124 that controls the physical shaft moment of the wind turbine rotor 108, which in turn improves tower clearance of the wind turbine 100 and reduces wear caused by unbalanced wind loads (e.g., caused by wind shear). The tower clearance may be referred to as a clearance provided for the blades to rotate without striking the tower or more specifically as a distance maintained between the tower and the rotating blades to prevent the rotating blades from striking the tower. Wind shear may cause the rotor to tip backward and this impresses undesired forces on the rotor shaft bearings. The pitch system can compensate for wind shear, but the pitch of each blade must be individually and constantly adjusted. This can cause wear and tear on the pitch drive components.

In accordance with one embodiment, a detecting system is configured to determine at least one of rotor loads, wind shear, wind speed, and load imbalance (which may be due to wind shear). An adjusting system is configured to adjust a shaft moment set point correction value based on at least one of rotor load, wind shear, wind speed, and/or load imbalance. The adjusting system is configured to correlate at least one of rotor load, wind shear, wind speed, and load imbalance through a system of equations or a look-up table.

In accordance with another embodiment, a detection system is configured to dynamically estimate the load imbalance from predetermined aerodynamic data of the system and a load imbalance measurement to provide a shaft moment set point correction value. A compensating system is configured to compute a shaft moment correction command based on the shaft moment set point correction value output from the adjusting system, and the pitch system is configured to adjust the load of at least one blade of the wind turbine based on the shaft moment set point correction command.

As multiple speeds of the wind, taken at different elevations, can be one indicator of wind shear, in accordance with another embodiment, the control system 124 adjusts a shaft moment set point correction value of the rotor 108 according to detected wind shear values or multiple wind speed values (taken along different elevations). As non-limiting examples only, a system of equations and/or a look-up table may include the following values: if the wind shear is 0.1, then the shaft moment set point correction is 900 kNm, if the wind shear is 0.2, then the shaft moment set point is 750 kNm, if the wind shear is 0.4, then the shaft moment set point is 650 kNm. The control system 124 may correlate the pre-stored reference shaft moment value corresponding to at least one of the detected wind shear, wind speed, and load imbalance due to wind shear.

Further, the control system 124 may compare the physical shaft moment of the rotor 108 with the adjusted reference shaft moment set point correction value to compute a shaft moment correction command for a system configured to adjust the load of at least one blade of the wind turbine, such as a blade pitch, flap position, micro tab position, spoiler position or active flow control device position, based on the shaft moment set point correction command. The flaps, micro tabs, spoiler and active flow control devices are indicated by numeral 230 in FIG. 2. In one embodiment, the control system 124 also factors in the rotor position (azimuth) of each individual blade when making the computations. The computed pitch angle command is sent to the pitch drive (or pitch system) 130 to change the pitch (or flap position, micro tab position, spoiler position or active flow control device position) of each of the blades. Particularly, the blades are moved or rotated by an angle included in the pitch angle command to change the aerodynamic forces acting on the rotating blades, which in turn controls the physical shaft moment of the rotor 108. Also, this change in the aerodynamic forces on the rotating blades may further reduce the magnitude and/or the duration of aerodynamic thrust load placed on the rotor 108. By reducing the aerodynamic thrust load on the rotor 108 and reducing pitch system activation, the overall wear and tear experienced by the pitch system and components is reduced.

Figure 2:
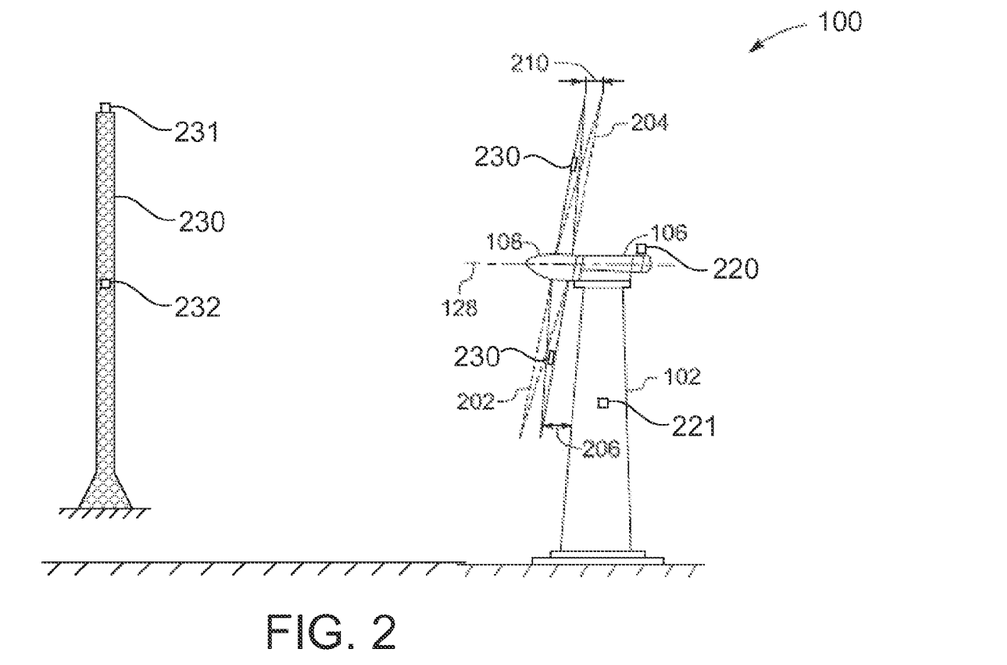
FIG. 2 is a diagrammatical illustration of the wind turbine of FIG. 1 depicting rotor loading, in accordance with aspects of the present disclosure.

Referring to FIG. 2, a diagrammatical illustration of the wind turbine 100, in accordance with aspects of the present disclosure, is illustrated. FIG. 2 illustrates rotor blades 202, 204 coupled to the rotor hub 116. The rotor blades 202, 204 are rotated at their initial position or "no load" position with a tower clearance 206. The tower clearance 206 may be referred to as the distance between the tower 102 and the blade that is in front of the tower 102. Further, when an aerodynamic thrust load or wind shear acts on the rotor 108, the blades 202, 204 of the rotor 108 may deflect towards the tower 102. The aerodynamic thrust load on the rotor 108 may be due to high speed wind passing across the rotor 108. For example, high aerodynamic thrust loads may occur when the speed of the wind is in a range of about 80% to about 120% of the rated wind speed. Wind shear load on the rotor 108 may be due to high speed wind passing across the top of rotor 108 and low speed wind passing across the bottom of rotor 108. In this case, the rotor blades will be in the position indicated by 202 and 204.

In operation, the deflection of the blades 202, 204 may impress unbalanced loads (i.e., load imbalance) on the rotor and/or main shaft bearings. To reduce fatigue caused by the unbalanced loading on the rotor 108, the control system 124 may be used to control the physical shaft moment of the rotor 108, which in turn improves the unbalanced loading due to wind shear. Particularly, in response to the deflection of the rotor 108 and/or other components of the wind turbine 100, the control system 124 may change the pitch of the blades so that the unbalanced loading on rotor 108 is reduced. More specifically, in one embodiment, the control system 124 may change the pitch of the blades so that the blade 202 that is in front of the tower 102 is pitched so that the rotor blade is more perpendicular to the wind direction, and blade 204 is pitched such that only a part of the wind energy impinges on the rotor blade. This action decreases the wind shear load on the rotor 108. The pitch of each of the blades is changed corresponding to the asymmetric pitch angles determined by the control system 124. The aspect of determining the asymmetric pitch angles will be explained in greater detail with reference to FIG. 4.

Figure 3:
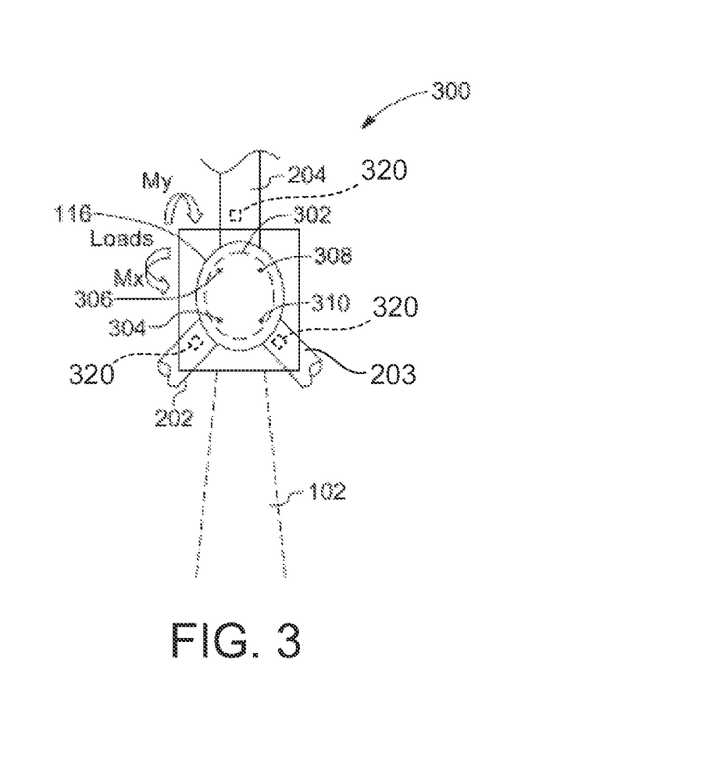
FIG. 3 is a diagrammatical illustration of the wind turbine of FIG. 1 depicting proximity sensors and a main shaft flange, in accordance with aspects of the present disclosure.

FIG. 3 is a diagrammatical illustration of a wind turbine depicting proximity sensors and a main shaft flange, in accordance with aspects of the present disclosure. The wind turbine 100 includes a main shaft flange 302 that is positioned around the rotor shaft (or main shaft) 114 (shown in FIG. 1). Particularly, the main shaft flange 302 is disposed on a portion of the rotor shaft 114 that is adjacent to the rotor hub 116 (shown in FIG. 1). In addition, to the main shaft flange 302, the wind turbine 100 includes one or more proximity sensors 304, 306, 308, 310 to measure the displacement of the main shaft flange 302. For example, the deflection of the rotor 108 may displace the main shaft flange 302 from a predetermined resting or "no load" position. In one embodiment, the one or more proximity sensors 304, 306, 308, 310 may be used to measure the displacement of the main shaft flange 302 relative to a non-deflecting reference frame. The non-deflecting reference frame may comprise, for example, the bedplate or the housing of the low-speed shaft main bearing.

In the embodiment of FIG. 3, the four proximity sensors 304-310 are positioned about 90 degrees apart on the surface of the main shaft flange 302. The proximity sensors 304-310 may generate signals in response to deflection of the wind turbine components, such as the rotor 108 and the main shaft flange 302. In one specific embodiment, the signals are generated when the wind speed is within a predetermined range, for example 80%-120% of the rated wind speed, as the aerodynamic thrust load may act across the rotor in this range. This aerodynamic thrust load may further deflect the rotor causing displacement of the main shaft flange. Wind shear may also act to deflect the rotor causing displacement. The proximity sensors 304-310 are used to measure the displacement of the main shaft flange 302 and send the generated signals that indicate the displacement of the main shaft flange 302 to the control system 124 for determining the physical shaft moment of the rotor 108. These signals may also be translated into an indication of rotor load, wind shear or load imbalance.

Operationally, the control system 124 may first determine the "no load" position during an initialization process. The "no load" position may be determined using turbine controller computations of the main shaft flange sensor signals during a rotor slow roll operation. This process may occur at system start-up with all rotor blades pitched to, for example, 65 degrees. Further, during the operation of the wind turbine 100, the control system 124 may determine the load on the blades that deflect the rotor 108 using the data or signals from the proximity sensors 304-310. In one embodiment, these signals may indicate the displacement of the main shaft flange 302 which is due to the deflection of the rotor 108. With this data or information, the control system 124 may change the pitch of the blades to reduce the aerodynamic thrust load on the blades.

A plurality of blade sensors 320 may be located in or near each blade 202, 203, 204, and the sensors 320 are configured to measure blade displacement, blade acceleration and/or the load on the blades. For example, asymmetric blade loads may indicate a load imbalance condition. A displacement sensor may be a proximity or distance measuring sensor. An acceleration sensor may be an accelerometer, and a load sensor may include displacement sensors, accelerometers or any other suitable sensor. The blade displacement, blade acceleration and/or blade loads can be translated into an indication of rotor load, wind shear or a load imbalance, and these values can be translated into shaft moment set point correction values and shaft moment correction commands that are used to control the pitch system.

Figure 4:
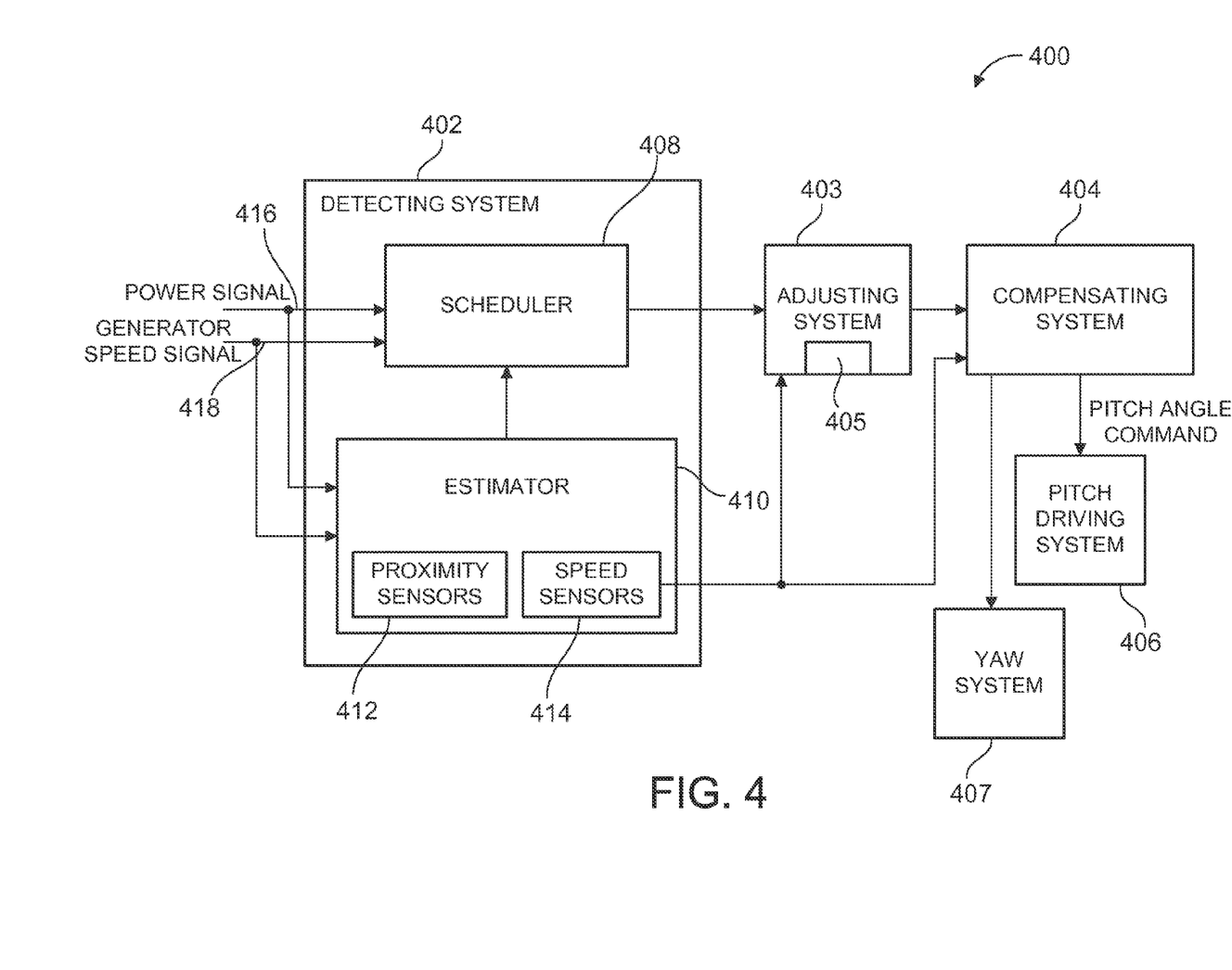
FIG. 4 is a block diagram of a control system in the wind turbine of FIG. 1, in accordance with aspects of the present disclosure.

Referring to FIG. 4, a block diagram of a control system, in accordance with aspects of the present disclosure, is depicted. For ease of understanding of the present disclosure, the control system 400 is described with reference to the components of FIG. 1. The control system 400 may be representative of the control system 124 of FIG. 1. The control system 400 may be configured for overall system monitoring and controlling of the wind turbine 100. In one example, the system monitoring and controlling may include pitch and speed regulation of the blades, high-speed shaft and yaw brake application, yaw and pitch motor application, and fault monitoring.

The control system 400 may be used to adjust the shaft moment set point correction value of the wind turbine 100. The control system 400 includes a detecting system 402, an adjusting system 403, a compensating system 404, and a pitch driving system 406 (or pitch system). The detecting system 402 is configured to determine at least one of rotor load, wind shear, wind speed, and load imbalance. The wind shear value may be determined from at least two anemometers 220, 221 spaced vertically along the wind turbine. A light detecting and ranging (LIDAR) system (or an ultrasonic measurement system) 140 may be configured to detect multiple wind speeds at vertically spaced locations along the wind turbine. A measurement tower 230 associated with a wind farm, including wind turbine 100, may include one or more wind speed detectors 231, 232 (e.g., anemometers, an ultrasonic measurement system, etc.) for detecting the wind shear. For example, the wind shear value can be obtained from wind speeds at multiple vertically spaced locations along tower 230. The wind shear may also be obtained from data output from a plurality of proximity sensors 304, 306, 308, 310 that are configured for measuring a displacement of the main shaft flange 302.

The adjusting system 403 is configured to adjust a shaft moment set point correction value based on at least one of rotor load, wind shear, wind speed, and/or load imbalance due. A reference shaft moment may be referred to as a shaft moment set point or reference value for the physical shaft moment of the rotor 108. Also, this reference shaft moment may be pre-stored prior to the operation of the wind turbine 100. In one embodiment, the reference shaft moment set point may be selected and stored in the control system 124 based on a standard wind speed rate of the wind turbine 100. The adjusting system 403 may be configured to reference a look-up table 405 that correlates shaft moment set point correction values with at least one of rotor load, wind shear, wind speed, and/or load imbalance. As non-limiting examples only, the look-up table 405 may include the following values: if the wind shear is 0.1, then the shaft moment set point correction is 900 kNm, if the wind shear is 0.2, then the shaft moment set point correction is 750 kNm, if the wind shear is 0.4, then the shaft moment set point correction is 650 kNm.

The compensating system 404 is configured to compute a pitch angle command based on the shaft moment set point correction output from the adjusting system 403. The pitch driving system 406 is configured to change the pitch of the rotor blades 202, 203, 204 based on the pitch angle command.

In the presently contemplated configuration, the detecting unit 402 includes a scheduler 408 and an estimator 410. The estimator 410 may be configured to determine the aerodynamic thrust and/or wind shear. Particularly, as a non-limiting example the estimator 410 receives a power signal 416 and a generator speed signal 418 from the generator 110. The power signal 416 may indicate maximum power produced by the generator 110. Similarly, the generator speed signal 418 may indicate a rotational speed of a generator rotor disposed within the generator 110. Thereafter, the estimator 410 utilizes the received power signal 416 and the generator speed signal 418 to determine the aerodynamic thrust on the rotor. If desired, an average angle of the blades coupled to the rotor hub 116 may be used in addition to the power produced by the generator 110 and/or the speed of the generator 110 to determine the aerodynamic thrust on the rotor.

In another embodiment, the estimator 410 utilizes the received power signal 416, the generator speed signal 418, and the average angle of the blades coupled to the rotor hub 116 to determine the speed of the wind passing across the wind turbine 100. For example, if the wind of a particular speed passes across the rotor 108, the blades that are positioned at a particular angle may interact with passing air flow or the wind to produce a lift that causes the rotor hub 116 to rotate about a longitudinal axis 128. This rotary motion of the rotor hub 116 may further rotate the generator rotor, which in turn produces electrical power at an output of the generator 110. Thus, by knowing the average blade angle, the power produced by the generator 110, and the speed of the generator rotor, the estimator 410 may determine the speed of the wind passing across the wind turbine 100. In another embodiment, one or more wind speed sensors 414 may be used to determine or predict the speed of the wind and the wind shear. Thereafter, the estimator 410 may provide at least one of wind shear, wind speed, and load imbalance due to wind shear to the scheduler 408.

As one example, in addition to determining the wind shear, aerodynamic thrust and/or wind speed, the estimator 410 may also measure a displacement of the main shaft flange 302. To that end, the estimator 410 may include one or more proximity sensors 412. The proximity sensors 412 may be representative of the proximity sensors 304-310 of FIG. 3. Further, these proximity sensors 304-310 may be used for measuring a displacement of the main shaft flange 302. Particularly, the rotor 108 may undergo high wind shear loading when the wind at multiple speeds passes across the rotor 108. This wind shear loading on the rotor 108 may deflect the rotor 108, which in turn displaces the main shaft flange 302 from an initial position or a predetermined position. In one embodiment, the main shaft flange 302 may displace from a fixed frame or a reference frame. Further, upon measuring the displacement of the main shaft flange 302, the estimator 410 may send the measured displacement of the main shaft flange 302 to the detecting system 408 in order to determine the load imbalance due to wind shear.

In accordance with aspects of the present disclosure, the scheduler 408 receives at least one of, determined wind shear, wind speed, and/or load imbalance due to wind shear from the estimator 410 and uses the wind shear, wind speed, and/or load imbalance due to wind shear to change or adjust the shaft moment set point correction value. The scheduler 408 may first verify whether the determined wind shear is above a predetermined value. If yes, then the scheduler 408 may change or adjust the shaft moment set point correction value corresponding to the wind shear, as stored in look-up table 405.

In another embodiment, the scheduler 408 receives the load imbalance due to wind shear from the estimator 410 and uses that to change the shaft moment set point correction value. The scheduler 408 may first verify whether the load imbalance due to wind shear is within a pre-determined range. For example, the pre-determined range may be 80%-120% of the shaft moment set point. If the load imbalance is within this pre-determined range, the scheduler 408 changes or adjusts the shaft moment set point value. In one embodiment, the scheduler 408 may use look-up table 405 for changing the shaft moment set point correction value. For example, the look-up table 405 may include the shaft moment set point correction values associated with their corresponding rotor loads, wind speeds, wind shear, or load imbalance values. The adjusting system 403 may select the shaft moment set point correction value that is associated with the determined rotor loads, speeds of the wind, wind shear, or load imbalance from the look-up table 405. Thereafter, the adjusting system 403 may send the changed shaft moment set point correction value to the compensating system 404.

In accordance with aspects of the present disclosure, the compensating system 404 is configured to receive the changed shaft moment set point correction value from the adjusting system 403 and the measured displacement of the main shaft flange from the estimator 410. The compensating system 404 may use the measured displacement of the main shaft flange 302 to determine the physical shaft moment of the wind turbine rotor 108. The adjusting system 403 may have a look-up table that includes different shaft moment set point corrections that are mapped to corresponding displacement values of the main shaft flange 302. The adjusting system 403 may use this look-up table to determine the shaft moment set point correction that is associated with the measured displacement value of the main shaft flange 302.

Upon determining the shaft moment, the compensating system 404 may compare this shaft moment set point with the changed reference shaft moment received from the adjusting system 403. Particularly, the compensating system 404 identifies a difference between the shaft moment and the changed shaft moment set point. If the difference between these shaft moments is above a predefined value, the compensating system 404 may compute an asymmetric pitch angle command corresponding to the difference between the two shaft moments. The pitch angle command may include one or more asymmetric pitch angles for each of the blades. In one embodiment, a Parks DQ transformation, a bias estimation method calculation, and/or other control technique is used to calculate the pitch angle or pitch increment for each rotor blade to reduce the overall asymmetric rotor loading due to wind shear.

The asymmetric pitch angle command is provided to the pitch driving system 406 for changing the pitch of the rotor blades 202, 203, 204, or yaw system 407 for changing the position (or direction) of the nacelle and rotor (i.e., the machine head). The pitch driving system 406 may employ one or more pitch drives 120 for changing the pitch of the blades. These asymmetric pitch angles are provided to the blades in such a way that the average pitch angle adjustment of the blades is zero and is given by the following relationship:

Blade 1=A sin($\Theta$)
Blade 2=A sin($\Theta$−120)
Blade 3=A sin($\Theta$+120)

Where A is the amplitude of the compensating shear command and $\Theta$ is the rotor azimuth position. For example, if the pitch angle of one of the blades is incremented by +1 degree, then the pitch angle of the other two blades are decremented by −0.5 degrees and −0.5 degrees. The pitch drive 120 is used to move or rotate the corresponding blade by an angle associated with its pitch angle. By changing the pitch of the blades, the physical shaft moment of the rotor 108 is controlled. By changing the pitch of the blades, the rotational movement of the blades may be varied, which in turn changes the aerodynamic forces acting on the rotor 108, particularly the blades. This change in the aerodynamic forces on the rotor 108 may mitigate the wind shear load on the rotor 108. By reducing the wind shear load and reducing pitch system operation, the overall wind turbine operation and longevity may be improved. The control system improves pitch system operation and operating life of the pitch system components (e.g., pitch drive motors, pitch bearings, etc.).

Figure 5:
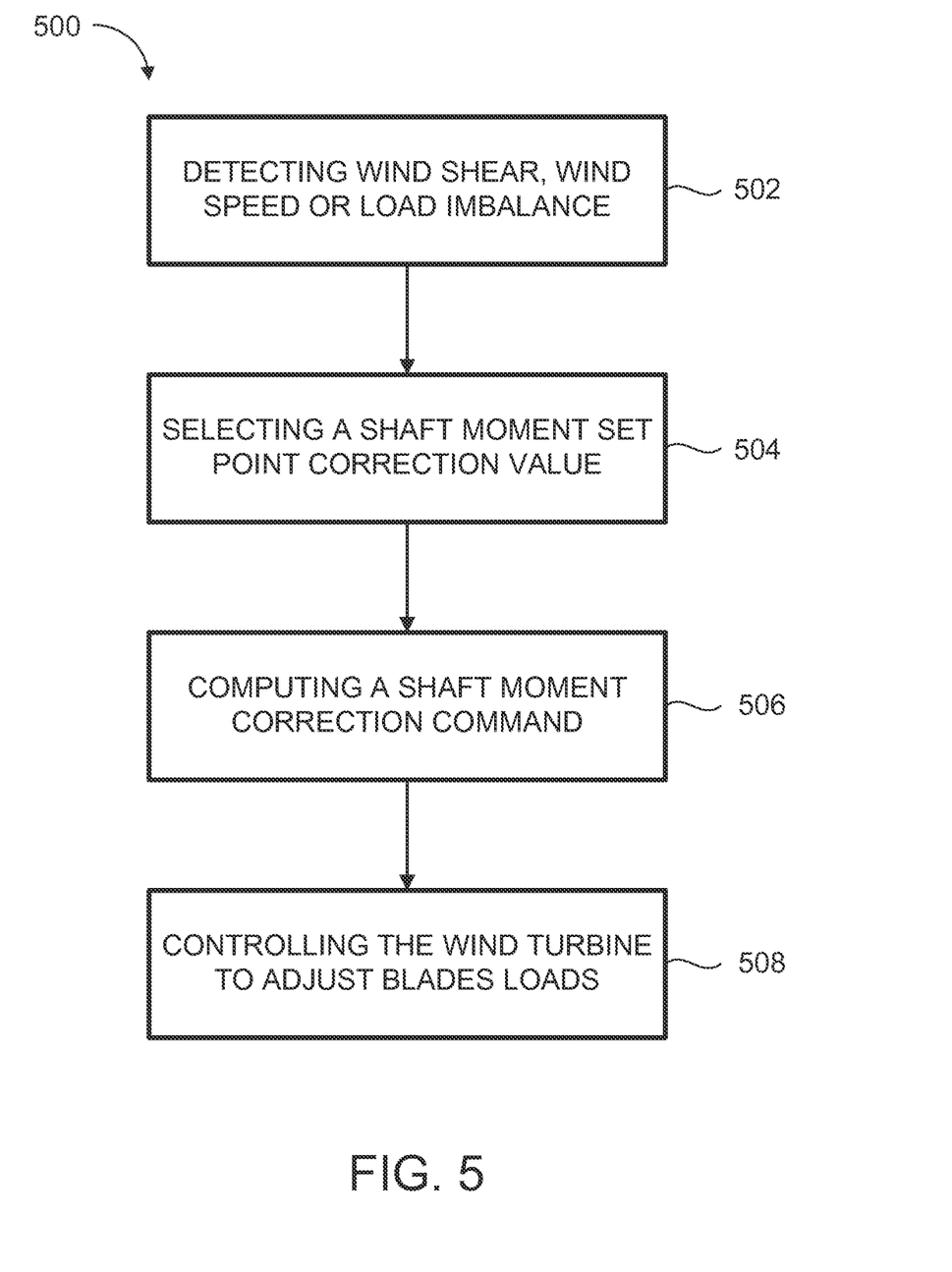
FIG. 5 is a flow chart illustrating a method for controlling rotor imbalance in the wind turbine, in accordance with aspects of the present disclosure.

FIG. 5 illustrates a flow chart for a method 500 for controlling rotor imbalance in the wind turbine, in accordance with aspects of the present disclosure. The method is described with reference to the components of FIGS. 1-4. The method 500 begins at detecting step 502, where at least one of rotor loads, wind shear, wind speed, and/or load imbalance is detected. In selecting step 504, a shaft moment set point correction value based on at least one of rotor loads, wind shear, wind speed, or load imbalance output from step 502 is selected. A shaft moment set point correction value may be selected based on a rotor load, load imbalance or wind shear value, and a look-up table is referenced that correlates shaft moment set point correction values with a rotor load, load imbalance or wind shear values. Alternatively, the shaft moment set point correction may be selected based on rotor load, multiple wind speed values, or load imbalance, and a look-up table is referenced that correlates shaft moment set point correction with these values. In either case, obtaining the shaft moment set point correction value may be accomplished by referencing look-up table 405 in adjusting system 403. In computing step 506, the pitch angle command is computed based on the shaft moment set point correction value output from the selecting step 504. In controlling step 508, the pitch of at least one blade, if not all the blades, is controlled or changed based on the pitch angle command output from the computing step 506.

The detecting step 502 may include obtaining output from at least two anemometers spaced vertically along the wind turbine, or obtaining output from a LIDAR system configured to detect multiple wind speeds at vertically spaced locations along the wind turbine, or obtaining output from a measurement tower associated with a wind farm that includes the wind turbine, or obtaining output from an ultrasonic measurement system configured to detect multiple wind speeds at vertically spaced locations along the wind turbine. Alternatively, the wind shear may be detected with data obtained from the proximity sensors 304-310, as pre-defined loads can be mapped to predetermined wind shear values.

The wind turbine's control system 124, 400 may be programmed for performing the steps of detecting 502 at least one of rotor load, wind speed, wind shear, and/or load imbalance, selecting 504 a shaft moment set point correction value based on at least one of the rotor load, wind shear, wind speed, and/or load imbalance, computing 506 a pitch angle command based on a shaft moment set point correction output from the selecting step, and controlling 508 a pitch of at least one blade of the wind turbine based on the pitch angle command with the pitch system. The control system 124 may be configured to communicate with at least two anemometers 220, 221 spaced vertically along the wind turbine, or to communicate with a light detecting and ranging (LIDAR) system 140 configured to detect multiple wind speeds at vertically spaced locations along the wind turbine or an ultrasonic measurement system. The control system may also be configured to communicate with a measurement tower 230 associated with a wind farm including the wind turbine, where the measurement tower includes a wind speed detector 231, 232 for detecting the wind shear value from wind speeds at multiple vertically spaced locations. Alternatively, the control system can be configured to communicate with a detecting system 402 that is configured to detect wind shear with data obtained from a plurality of proximity sensors configured for measuring a displacement of a main shaft flange of the wind turbine, or a plurality of blade sensors. The control system 400 is configured to communicate with the adjusting system 403 that is configured to adjust a shaft moment set point correction value based on the wind shear value, and the adjusting system 403 references a look-up table 405 that correlates shaft moment set point correction values with rotor load, wind speed, wind shear, or load imbalance values.

Figure 6:
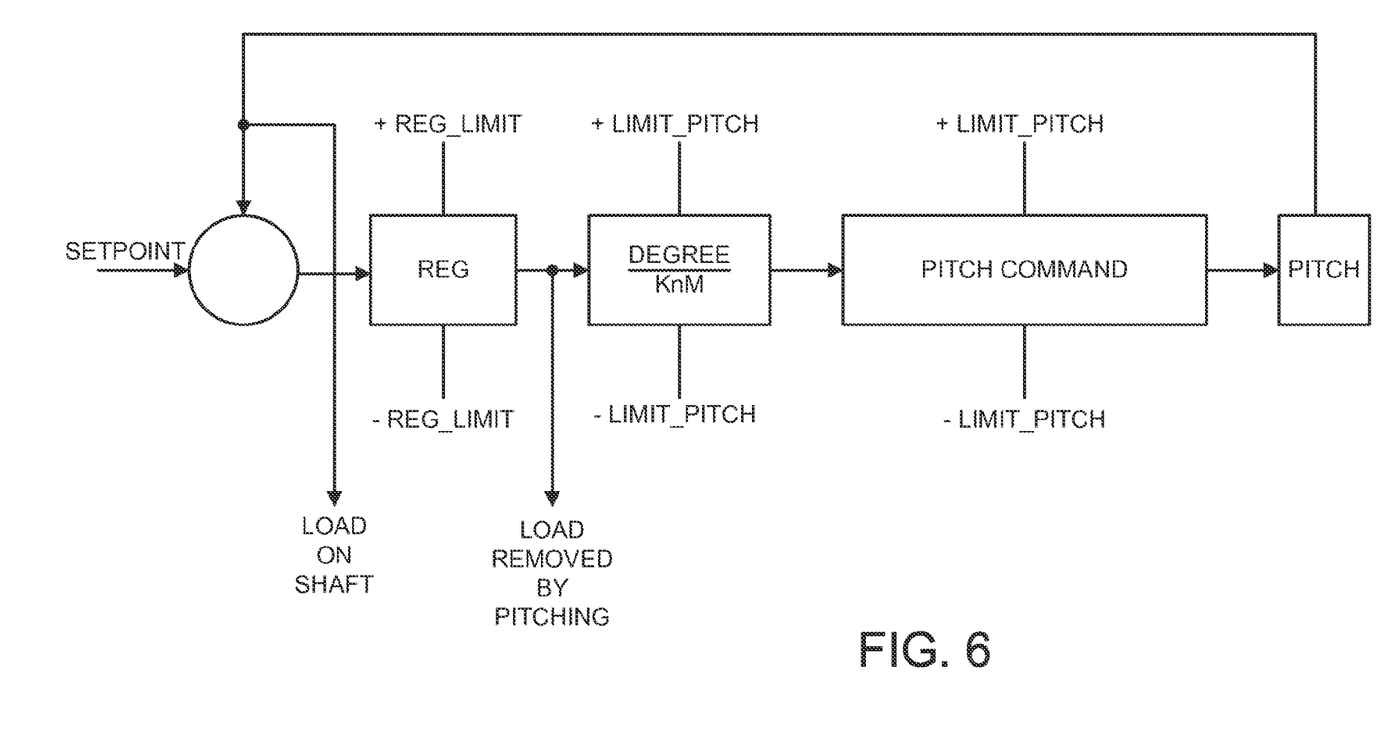
FIG. 6 illustrates a system of equations used to adjust the shaft moment set point correction value, according to an aspect of the present disclosure.

FIG. 6 illustrates a system of equations used to adjust the shaft moment set point correction value, according to an aspect of the present invention. Gravity load is known and is constant. The shear load equals the measured load minus the gravity load plus the pitching load and is given by the following equation.

Shear load=measured load−gravity load+regulator compensating load.

The shear load regulator output must be limited to a value that resides within the capabilities of the pitch system and blade operating limits. Excessive pitch of the blade may transiently drive it into a stall condition which could increase other loads or adversely impact energy capture. The pitch system has limits on maximum velocities and accelerations which also need to be enforced. The regulator limit (+reg$_{limit}$) can be determined by the following equation.

$$+reg_{limit} = +limit_{pitch} * dF/d\theta \frac{kNm}{\text{degree}}$$

Where the pitch limit (+limit$_{pitch}$) in degrees is determined by the capabilities of the pitch system and blade stall margins and the kNm/degrees term (dF/dθ) is the gain of the blade which comes from the blade geometry expressed as a partial derivative in rate of change in thrust per degree of pitch. The blade gain may be expressed as a constant, derived from a table lookup or dynamically computed as a function of pitch angle.

The invention allows one to measure the amount of shear (or loads) on the rotor when the component from gravity is known, detect when the system is operating at maximum capability and provide a means to modify the setpoint to bring the shear regulator back into its operating limits. The setpoint (i.e., steady state operating point of the bending moment on the rotor shaft) can be moved to a level such that steady low cycle, dynamic and high cycle fatigue limits can be adjusted based on wind conditions. In the above example wind speed is not required to calculate wind shear, as the loads on the wind turbine can be used to calculate wind shear (or rotor loads or load imbalances). The rotor load or the load imbalance may be detected, and this load/imbalance can be separated into their respective components. For example, the rotor load components may include one or more of, gravity imbalance and aerodynamic imbalance, and the load imbalance components may include one or more of gravity imbalance, shear imbalance and thrust imbalance. In addition, the load imbalance may be corrected by adjusting the pitch of each of the blades while accounting for operating limits and changes in blade forces due to geometry and pitch angles. Load imbalance may also be corrected by adjusting the yaw position of the wind turbine (i.e., the rotor and nacelle) while accounting for operating limits, or both the yaw position and the blade pitch angles may be adjusted. Adjusting the yaw position of the nacelle and rotor (i.e., the machine head) can be performed to modify the nodding moment (and reduce loads or imbalances) especially when horizontal shear or upflow/downflow is present.

Figure 7:
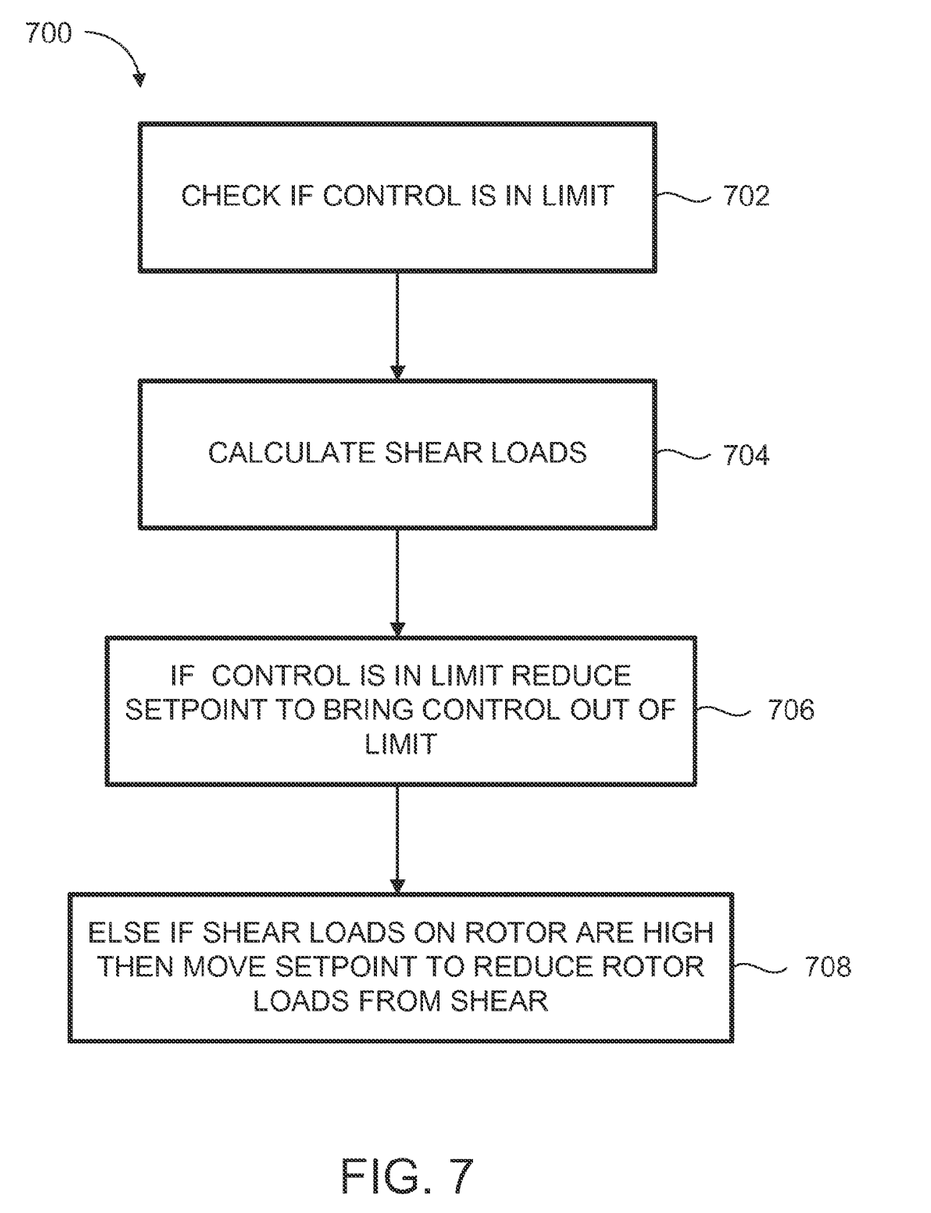
FIG. 7 illustrates a method for changing the setpoint, according to an aspect of the present disclosure.

FIG. 7 illustrates a method 700 for changing the setpoint, according to an aspect of the present invention. The method 700 includes a step 702 of checking the control to verify that it is in limit. In step 704 the shear loads (or rotor loads) are calculated. In step 706, if the control is in limit then the setpoint is reduced to bring the control out of limit. In step 708, if the shear loads (or rotor loads) are the rotor are high then the setpoint is moved to reduce rotor loads, which are typically due to wind shear This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system for a wind turbine comprising:
   a detecting system configured to determine at least one of a rotor load, a wind shear, a wind speed, and a load imbalance due to wind shear;
   an adjusting system configured to adjust a shaft moment set point correction value based on at least one of the rotor load, the wind shear, the wind speed, and the load imbalance;
   a compensating system configured to compute a shaft moment correction command based on the shaft moment set point correction value output from the adjusting system; and
   a pitch system configured to adjust a pitch of at least one blade of the wind turbine based on the shaft moment set point correction command or a yaw system configured to adjust the yaw position of a rotor based on the shaft moment set point correction command.

2. The system of claim 1, wherein the detecting system further comprises:
   a plurality of proximity sensors configured for measuring a displacement of a main shaft flange; and
   wherein the displacement is translated into an indication of at least one of the rotor load, the wind shear, or the load imbalance.

3. The system of claim 1, wherein the detecting system further comprises:
   a plurality of blade sensors configured for measuring at least one of a displacement, an acceleration or a load on, or of, the at least one blade; and
   wherein the displacement, the acceleration or the load is translated into an indication of at least one of the rotor load, the wind shear, or the load imbalance.

4. The system of claim 1, wherein the detecting system further comprises at least one of:
   at least two anemometers spaced vertically along the wind turbine;
   a light detecting and ranging (LIDAR) system;
   an ultrasonic measurement system; or
   a measurement tower associated with a wind farm including the wind turbine, the measurement tower including a wind speed detector for detecting the wind shear value from wind speeds at multiple vertically spaced locations.

5. The system of claim 1, wherein the adjusting system is configured to adjust the shaft moment set point correction value by dynamically estimating the load imbalance due to the wind shear from predetermined aerodynamic data and a load imbalance measurement to provide the shaft moment set point correction.

6. The system of claim, 1 wherein the adjusting system is configured to adjust the shaft moment set point correction value by correlating the shaft moment set point correction value with at least one of, the wind shear, the wind speed, or the load imbalance due to wind shear through a system of equations or a look up table.

7. The system of claim 1, wherein the pitch system is configured to change the load on the at least one blade by adjusting at least one of:
blade pitch, flap position, micro tab position, spoiler position and active flow control device position.

8. A method for controlling rotor imbalance in a wind turbine, the method comprising:
detecting at least one of a rotor load, a wind shear, a wind speed, and a load imbalance;
selecting a shaft moment set point correction value based on at least one of the rotor load, the wind speed, the wind shear, and the load imbalance;
computing a shaft moment correction command based on the shaft moment set point correction value output from the selecting step; and
controlling a pitch system to adjust a load of at least one blade of the wind turbine based on the shaft moment correction command, or controlling a yaw system to adjust a rotor position based on the shaft moment set point correction value.

9. The method of claim 8, the detecting step further comprising:
measuring a displacement of a main shaft flange with a plurality of proximity sensors; and
wherein the displacement is translated into an indication of at least one of the rotor load, the wind shear, or the load imbalance.

10. The method of claim 8, the detecting step further comprising:
detecting the rotor load or the load imbalance, and separating the rotor load or the load imbalance into their respective components, and
wherein the rotor load components comprise one or more of, gravity imbalance and aerodynamic imbalance, and the load imbalance components comprise one or more of gravity imbalance, shear imbalance and thrust imbalance.

11. The method of claim 8, wherein the detecting step further comprises at least one of:
obtaining output from at least two anemometers spaced vertically along the wind turbine;
obtaining output from a light detecting and ranging (LIDAR) system;
obtaining output from an ultrasonic measurement system; or
obtaining output from a measurement tower associated with a wind farm including the wind turbine, the measurement tower including a wind speed detector for detecting the wind shear from wind speeds at multiple vertically spaced locations.

12. The method of claim 8, wherein the selecting step further comprises:
selecting the shaft moment set point correction value based on correlating at least one of the rotor load, the wind shear, the wind speed, or the load imbalance through a system of equations or a look up table.

13. The method of claim 8, wherein the selecting step further comprises:
selecting a shaft moment set point correction value based on dynamically estimating the load imbalance from predetermined aerodynamic data and a load imbalance measurement to provide the shaft moment correction command.

14. The method of claim 8, wherein the load imbalance is corrected by adjusting the pitch of the at least one blade while accounting for the kNm/degree term in the following equation:

$$+reg_{limit} = +limit_{pitch} * dF/d\theta \frac{kNm}{degree}$$

where $+reg_{limit}$ is regulator limit, $+limit_{pitch}$ is pitch limit and $dF/d\theta$ kNm/degree is gain of the blade expressed as a partial derivative in rate of change in thrust per degree of pitch.

15. A wind turbine comprising:
a tower configured to support a nacelle and a rotor, the rotor having at least one rotor blade;
a control system programmed for performing the steps of:
detecting at least one of a rotor load, a wind shear, a wind speed, and a load imbalance due to wind shear;
selecting a shaft moment set point correction value based on at least one of the rotor load, the wind shear, the wind speed, and the load imbalance due to wind shear;
computing a shaft moment correction command based on the shaft moment set point correction value output from the selecting step; and
controlling a pitch system to adjust the load of at least one blade of the wind turbine based on the shaft moment correction command.

16. The wind turbine of claim 14, wherein the control system is configured to communicate with at least two anemometers spaced vertically along the wind turbine, or with a light detecting and ranging (LIDAR) system.

17. The wind turbine of claim 14, wherein the control system is configured to communicate with an ultrasonic measurement system.

18. The wind turbine of claim 14, wherein the control system is configured to communicate with a measurement tower associated with a wind farm including the wind turbine, the measurement tower including a wind speed detector for detecting the wind shear value from wind speeds at multiple vertically spaced locations.

19. The wind turbine of claim 14, wherein the control system is configured to communicate with a detecting system that is configured to detect the load imbalance due to wind shear from predetermined aerodynamic data and a load imbalance measurement system.

20. The wind turbine of claim 14, wherein the control system is configured to communicate with an adjusting system that is configured to adjust the shaft moment set point correction value based on correlating at least one the wind shear, the wind speed, and the load imbalance due to wind shear through a system of equations or a look up table.

* * * * *

UNITED STATES PATENT AND TRADEMARK OFFICE
CERTIFICATE OF CORRECTION

PATENT NO. : 9,567,978 B2
APPLICATION NO. : 14/524229
DATED : February 14, 2017
INVENTOR(S) : Marwaha et al.

It is certified that error appears in the above-identified patent and that said Letters Patent is hereby corrected as shown below:

On the Title Page

In Item (56), under "U.S. PATENT DOCUMENTS", in Column 2, Line 2, delete "Moroz" and insert -- Moroz et al. --, therefor.

On Page 2, in Item (56), under "U.S. PATENT DOCUMENTS", in Column 1, Line 1, delete "Rebsdorf" and insert -- Rebsdorf et al. --, therefor.

On Page 2, in Item (56), under "U.S. PATENT DOCUMENTS", in Column 1, Line 3, delete "Wilson" and insert -- Wilson et al. --, therefor.

On Page 2, in Item (56), under "U.S. PATENT DOCUMENTS", in Column 1, Line 7, delete "Adams" and insert -- Adams et al. --, therefor.

In the Drawings

In Fig. 5, Sheet 4 of 6, in Step "508", in Line 2, delete "BLADES" and insert -- BLADE --, therefor.

In the Specification

In Column 5, Line 55, delete "example" and insert -- example, --, therefor.

In Column 8, Line 8, delete "example" and insert -- example, --, therefor.

In Column 9, Line 46, delete "example" and insert -- example, --, therefor.

In Column 10, Line 29, delete "detecting system 408" and insert -- detecting system 402 --, therefor.

In Column 11, Line 31, delete "pitch drives 120" and insert -- pitch drives 130 --, therefor.

Signed and Sealed this
Second Day of May, 2017

Michelle K. Lee
*Director of the United States Patent and Trademark Office*

CERTIFICATE OF CORRECTION (continued)
U.S. Pat. No. 9,567,978 B2

In Column 11, Lines 43-44, delete "pitch drive 120" and insert -- pitch drive 130 --, therefor.

In the Claims

In Column 14, Line 62, in Claim 6, delete "claim, 1" and insert -- claim 1, --, therefor.

In Column 16, Line 55, in Claim 20, delete "one the" and insert -- one of the --, therefor.